United States Patent [19]

Selvaratnam

[11] 3,894,059

[45] July 8, 1975

[54] PROCESS FOR THE OXIDATION OF OLEFINES

[75] Inventor: Thillyampalam Selvaratnam, Sale, England

[73] Assignee: Petrocarbon Developments Limited, Manchester, England

[22] Filed: Apr. 30, 1973

[21] Appl. No.: 355,437

[30] Foreign Application Priority Data

May 3, 1972 United Kingdom............... 20696/72

[52] U.S. Cl. .............. 260/348.6; 204/95; 260/634; 260/636; 423/424
[51] Int. Cl........ C07d 1/04; C07d 1/12; C07d 1/14
[58] Field of Search..................... 260/348.6; 204/95

[56] References Cited
UNITED STATES PATENTS

| | | | |
|---|---|---|---|
| 1,253,615 | 1/1918 | McElroy............................... | 204/80 |
| 1,695,250 | 12/1928 | Curme et al...................... | 260/348.6 |
| 1,996,638 | 4/1935 | Britton et al..................... | 260/348.6 |
| 2,463,850 | 3/1949 | Brooks.............................. | 260/348.6 |
| 2,810,768 | 10/1957 | Cofer............................... | 260/348.6 |

*Primary Examiner*—Norma S. Milestone
*Attorney, Agent, or Firm*—Browdy and Neimark

[57] ABSTRACT

Processes are provided for the oxidation of olefinically unsaturated compounds to oxirane compounds, vic-glycols and vic-halohydrins in which the olefinically unsaturated compound, carbon dioxide water and hypohalite are brought into intimate contact so as to form vic-halohydrin, and if desired, exposing the vic-halohydrin to aqueous bicarbonate so as to form oxirane compound and/or vic-glycol. Bicarbonate is formed as by-product in the production of vic-halohydrin and this bicarbonate may be used to convert the vic-halohydrin to oxirane compound or vic-glycol. Also carbon dioxide is formed as by-product during the conversion and this is advantageously used to provide carbon dioxide required for the production of the vic-halohydrin. Similarly, the hypohalite is conveniently formed by electrolysis of metal halide derived as by-product of the conversion of vic-halohydrin to oxirane compound or vic-glycol.

18 Claims, 1 Drawing Figure

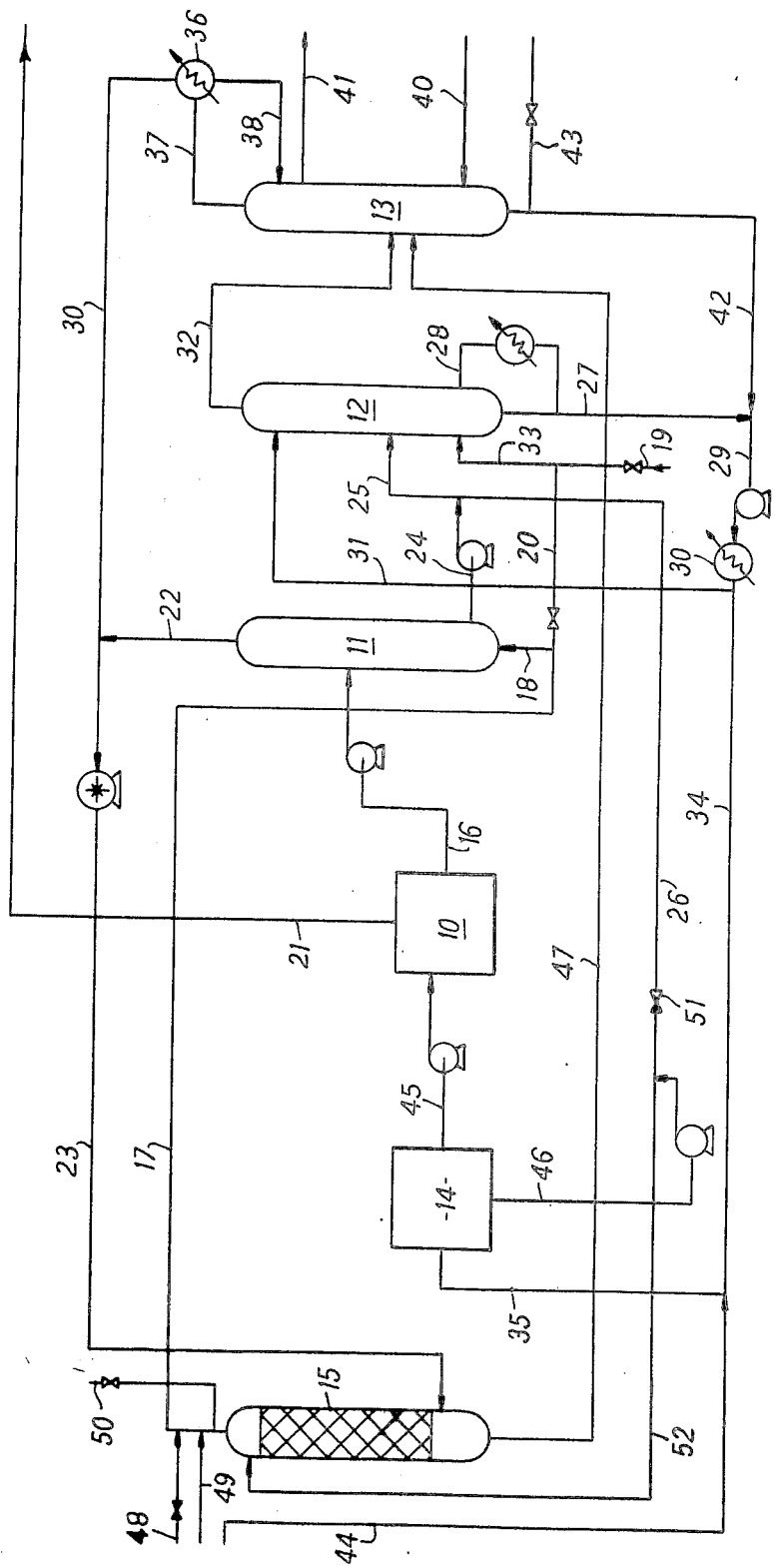

PROCESS FOR THE OXIDATION OF OLEFINES

This invention relates to a process for the oxidation of olefinically unsaturated compounds and especially for the production of oxirane compounds, vic-glycols and vic-halohydrins.

Oxirane compounds and particularly olefin oxides have hitherto been commercially produced either by the so-called chlorhydrin process, which requires the use of chlorine as a raw material, or by direct oxidation of olefins using air, oxygen, peroxides or hydroperoxides. At the present time, ethylene oxide is produced almost entirely by the direct oxidation of ethylene with oxygen or air over silver and other catalysts, the yield of ethylene oxide being about 70 percent on ethylene, the balance going to carbon dioxide. Currently, more than 80 percent of the production of propylene oxide is by the chlorhydrin process, which has the disadvantage of producing byproducts such as dichloropropane and dichloro-isopropyl ether, which, apart from consuming costly chlorine, have negligible commercial uses.

Another very important disadvantage of the chlorhydrin process is that it produces large quantities of hot effluents containing relatively small (3–5 percent) concentrations of alkali or alkaline earth chloride, which are costly to treat for disposal or for recycle of their chlorine content, and which are claimed to be damaging to the environment. In recent years, propylene oxide is being produced also by the capital intensive direct oxidation process, which has the disadvantage of co-producing very large quantities of by-products which cause fluctuations of market stability. Epichlorhydrin continues to be produced only by the chlorhydrin process, with all the disadvantages of by-products and effluents.

According to one aspect of the present invention, there is provided a process for the production of an oxirane and/or a vic-glycol which comprises the steps of (a) forming a vic-halohydrin by bringing into intimate contact an olefinically unsaturated compound, carbon dioxide, water and a metal hypohalite, and (b) converting vic-halohydrin formed in step (a) to oxirane compound and/or vic-glycol by exposure of the vic-halohydrin to an aqueous medium containing a metal bicarbonate.

The individual process comprising step (a) above forms a further separate aspect of the present invention, and thus the present invention also provides a process for the production of a vic-halohydrin which comprises bringing into intimate contact an olefinically unsaturated compound, carbon dioxide, water and a hypohalite, and recovering vic-halohydrin from the product mixture so formed.

The processes comprised by steps (a) and (b) are believed to operate in accordance with the following equations (where X is halogen, $>C=C<$ represents the olefinically unsaturated compound and for reasons of simplicity, the hypohalite is represented as being one of a monovalent metal, indicated by M, although other hypohalites such as ammonium hypohalite and hypohalites of polyvalent metals may also be used):

(a)  

Overall: 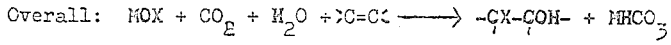

(b)  

or 

Overall, the production of oxirane compound and of vic-glycol may be represented by the following equations:

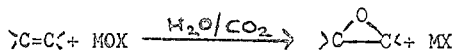

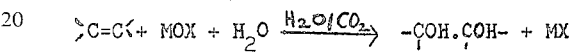

and the process for the production of oxirane compound and/or a vic-glycol provided in accordance with the invention may be stated as comprising the oxidation of an olefinically unsaturated compound in the presence carbon dioxide with an aqueous medium containing hypohalite ions, and where vic-glycol is required at the expense of oxirane compound, hydrolyzing oxirane product of the oxidation.

The olefinically unsaturated compound may be a hydrocarbon for example ethylene or propylene, or a substituted hydrocarbon, for example allyl chloride. Thus, products which may be obtained by the process of the invention include ethylene oxide, propylene oxide and epichlorhydrin and the corresponding vic-glycols and vic-chlorhydrins. The invention has particular economic significance when applied to the oxidation of olefinically unsaturated compounds having a small number of carbon atoms, particularly 2 or 3.

It will be seen that the reaction ocuring in step (a) results in the production of vic-halohydrin together with bicarbonate and that vic-halohydrin and bicarbonate are required in the reaction of step (b). Accordingly the bicarbonate by-product and unreacted water from step (a) may be used to provide the aqueous medium required in step (b) and in these circumstances, if steps (a) and (b) are carried out consecutively to produce oxirane compound and/or glycol from an olefinically unsaturated compound, the product mixture from step (a) may advantageously be utilizing directly in step (b), there being no need to separate the vic-halohydrin. Thus, for example, the product mixture from step (a) may be fed directly to a contacting device, for example a reaction and stripping column (with or without the addition of more water) where step (b) is carried out.

In order to obtain good yields of vic-halohydrin and to reduce the possibility of undesirable by-products being produced, step (a) should be carried out at a relatively low temperature and at a relatively low concentration of hypohalite. Thus, step (a) is preferably carried out at a temperature below 10°C, although of course it is desirable to maintain the reaction mixture above its freezing point. In particular, operation at a temperature in the range from −15°C to +10°C, especially from +5°C to +10°C is generally preferred. The concentration of hypohalite used in step (a), is preferably not in excess of about 6 wt percent and most preferably lies in a range from 2 to 5 wt percent. The contacting can conveniently be carried out by transferring the aqueous solution to a contacting device such as a distributer or packed column and introducing the carbon dioxide and olefinically unsaturated compound into the device, preferably in the form of an equimolar mixture since this satisfies the stoichiometry of the reaction.

The reactions occuring in step (a) are assisted by operation at a relatively high system pressure, whereas the reactions occuring in step (b) are assisted by relatively low pressures. Thus step (a) is preferably carried out at superatmospheric pressure, for example in the range from 1.5 to 5.0 Kg/cm² absolute and step (b) at a pressure of from 0.5 to 2.0 Kg/cm² absolute.

Step (b) is generally carried out at a higher temperature than step (a), and preferably at a temperature in the range of 50°C to 115°C. Operation towards the higher end of this temperature range, for example in the region of 115°C, tends to result in hydrolysis of oxirane compound to vic-glycol and, furthermore, available evidence suggests that high concentrations of bicarbonate, for example concentrations in excess of the stoichiometric quantity, tends to result in hydrolysis of oxirane compound. Accordingly, if it is desired to produce an oxirane compound as opposed to a vic-glycol it is desirable to carry out step (b) using not more that the theoretical quantity of bicarbonate and to remove the oxirane compound rapidly from contact with hot aqueous bicarbonate solution. The removal of oxirane compound may be assisted by stripping, for example by injecting steam into the reaction mixture. The carbon dioxide formed as co-product in step (b) can be used to help to strip the oxirane compound and it has been found that the injection of additional carbon dioxide and/or the injection of steam and/or olefinically unsaturated compound corresponding to the oxirane compound also assists in stripping the desired oxirane compound and reduces back-reaction to vic-halohydrin or coproduction of glycol. The use of olefinically unsaturated compound has been found to be particularly advantageous in this respect.

In a process that is preferred for economic reasons, the hypohalite is provided by electrolysis of an aqueous solution of metal halide. Since metal halide is produced as a by-product of step (b), when a metal bicarbonate is used in the step the aqueous solution of metal halide may advantageously be derived from the product of step (b). In fact it has been found that the product of step (b) is generally remarkably free from contaminants likely to foul the electrodes used for, or otherwise interfere with, the electrolysis and it is believed that the presence of trace remnants of hypohalite in the product of step (a) assists in maintaining this freedom from contaminants by oxidizing potentially harmful substances. The presence of oxirane compound and/or vic-glycol is not considered to be disadvantageous when carrying out the electrolysis, but it is desirable to remove at least part thereof. Also carbon dioxide produced in step (b) may be recycled to step (a) towards providing at least a portion of, and preferably substantially all of the carbon dioxide requirement of that step so that the only additional requirement for carbon dioxide is as make-up for unavoidable losses.

The concentration of the aqueous metal halide solution subjected to electrolysis is preferably maintained at a relatively low level and preferably less than 27 percent by weight to assist in providing a satisfactory concentration of metal hypohalite for use in step (a). On the other hand, too low a concentration of metal halide may result in the undesirable evolution of oxygen during the electrolysis and it has been found that a concentration in the range from 15 to 27 percent by weight is generally satisfactory.

The electrolysis usually results in the conversion of only a portion of the metal halide to metal hypohalite and the product of the electrolysis therefore generally comprises an aqueous solution containing both metal halide and metal hypohalite. There is no need to effect a separation of the metal hypohalite prior to carrying out step (a) and this is a particularly advantageous feature of the use of electroysis to produce the metal hypohalite. Also the vic-halohydrin produced in step (a) is believed to be stabilized by the presence of halide ions.

It will be seen that by recycling the carbon dioxide and metal halide it is possible to set up a cyclic process for producing an oxirane compound and/or vic-glycol from an olefinically unsaturated compound, in which the only additional reagents required are water (which in effect provides the oxygen of the oxirane compound and the hydroxyl groups of the vic-glycol) and make-up quantities of carbon dioxide and metal halide. In addition it is possible to operate the process without the production of large quantities of noxious effluents.

Thus according to a further aspect of the present invention there is provided a process for converting an olefinically unsaturated compound to an oxirane compound and/or a vic-glycol which comprises the steps of:

i. forming an aqueous solution containing a metal hypohalite by electrolysis of an aqueous solution of metal halide;

ii. intimately contacting an olefinically unsaturated compound and carbon dioxide with aqueous solution containing metal hypohalite formed in step (i) so as to form an aqueous solution of metal bicarbonate and vic-halohydrin;

iii. maintaining metal bicarbonate and vic-halohydrin formed in step (ii) in contact with one another under conditions of temperature resulting in reaction to form an oxirane compound and/or vic-glycol together with metal halide, carbon dioxide and water;

iv. separately recovering carbon dioxide, an aqueous solution of metal halide and a product stream comprising oxirane compound and/or vic-glycol from the product mixture formed in step (iii);

v. recycling carbon dioxide from step (iv) for use in step (ii) and (vi) recycling aqueous metal halide solution from step (iv) for electrolysis in accordance with step (i).

Preferred conditions for carrying out the above process are now described.

Step (i)

An aqueous solution of a metal halide (for example sodium chloride) having a concentration in the range from 15 to 27 wt percent is electrolysed at a temperature of from −20°C to +5°C in an electrolytic cell of the recirculation type under conditions to yield a dilute solution containing up to 6 wt percent and preferable from 2 to 5 wt percent of metal hypohalite in an aqueous solution of the metal halide.

The overall reaction (as illustrated by the electrolysis of sodium chloride) is as follows:

NaCl + H₂O 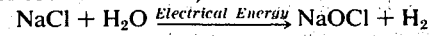 NaOCl + H₂

The hydrogen evolved is led away and may be compressed prior to disposal as a valuable by-product of the process.

Step (ii)

The aqueous metal hypohalite solution from step (i) may then be pumped to a contacting device, for example a distributor or packed column where it is reacted with an excess of a preferably equimolar mixture of carbon dioxide and an olefinically unsaturated compound (for example ethylene or propylene) at a low temperature of, for example, from −5° to +10°C for a time sufficient for reaction to take place. The reaction may be illustrated as follows (R is for example H or CH₃):

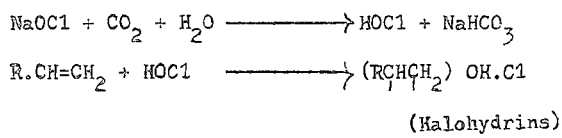

(Halohydrins)

By carrying out the reactions under the conditions referred to above, substantially no byproducts such as dichloroalkanes and dichloroalkyl ethers are produced and the reaction takes place to near completion yielding a product containing equimolar quantities of halohydrins and metal bicarbonate, for example sodium bicarbonate, in a metal halide solution.

The excess carbon dioxide and olefinically unsaturated compound (for example propylene or ethylene) may be compressed and recycled after scrubbing in a tower with chilled water. The feed of olefinically unsaturated compound may be introduced into this recycle. Any inerts in the olefinically unsaturated compound may be vented at an appropriate point in the recycle.

Step (iii)

The product from Step (ii) comprising an equimolar mixture of halohydrins and metal bicarbonate in aqueous halide solution may then be pumped to a reaction and stripping column where oxirane compound is produced by the overall reaction:

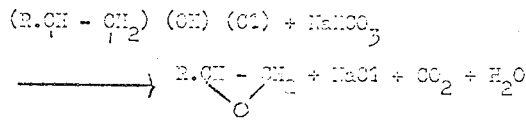

In order to carry out this reaction efficiently and to strip the epoxide formed as soon as it is formed, the following procedures and conditions may be adopted:

The system temperature is maintained in the range of 50°C to 115°C.

The system pressure is less than 3 atmospheres and preferably in the range from 0.5 to 2 Kg/cm² absolute.

Stripping agent such as carbon dioxide in addition to that produced in situ in the course of the reaction and/or olefinically unsaturated compound and/or steam may be employed to drive out the epoxide more or less rapidly.

The feed to the reaction and stripping column may be diluted with water.

Steps (iv) and (v)

The epoxide stripped out in Step (iii), which contains carbon dioxide and olefinically unsaturated compound (when the latter is used for stripping), may then be fed to a distillation column from which pure oxirane compound may be taken as a side-stream well below the top of the column. The overhead gases containing some oxirane compound, carbon dioxide and olefinically unsaturated compound (when the latter is used in stripping) may join the carbon dioxide and olefinically unsaturated compound from step (ii) and proceed to the water scrubbing tower referred to in Step (ii) above, where the oxirane compound is absorbed in chilled water. The scrubbed carbon dioxide and olefinically unsaturated compound (if present) are recycled to Step (ii). The absorbate containing oxirane compound may be continuously returned to the distillation column, which preferably operates at near total reflux, the reflux being provided by a refrigerant condenser operating at −10° to −30°C. Reboil heat to the column may be supplied by low pressure steam in a closed or open system.

Step (vi)

The bottom product of Step (iii), which consists of an aqueous solution of metal halide with minimal content of impurities is recycled back to Step (i). If dilution with water as described above is effected, such water may be removed if desired, preferably by freezing, before the salt solution proceeds to the electrolytic cell of Step (i). If such dilution is not effected, the salt solution can simply be cooled to the temperature required in Step (i). The net feed to the electrolytic cell of Step (i) is, in effect, the stoichiometric amount of water used up for the production of one atom of oxygen per molecule of oxirane compound produced.

The process of the invention will now be described by way of example with particular reference to the accompanying drawing which illustrates a flow sheet of apparatus suitable for converting an olefinically unsaturated compound, for example ethylene or propylene, to the corresponding oxirane compound.

Referring to the drawing, 10 represents an electrolytic cell, for example of the Krebs type, 11 represents an absorption column, 12 represents a saponifier, 13 represents a distillation column, 14 represents a freezing unit, for example of the Zarchin-Colt type, and 15 represents a recycle gas scrubber.

In use of the apparatus, an aqueous solution of metal halide is subjected to electrolysis at a temperature of from −5° to +10°C in cell 10 to convert a portion of the metal halide to metal hypohalite. The resulting aqueous solution containing metal halide and metal hypohalite is pumped via line 16 to absorption column 11 where it is contacted with a gaseous mixture of carbon dioxide and olefinically unsaturated compound introduced via lines 17 and 18. Additional olefinically unsaturated compound may be introduced into the absorption column via lines 19 and 20.

The temperature in the absorption column is maintained in the range from −5° to +10°C, for example at about +5°C.

Hydrogen is formed as a by-product in the electrolytic cell and passes via line 21 for compression and storage.

The gaseous effluent from the absorption column passes via lines 22 and 23 to the recycle gas scrubber, and the liquid effluent from the absorption column, which comprises water, metal halide, metal hypohalite, metal bicarbonate and vic-halohydrin corresponding to the olefinically unsaturated compound is pumped via lines 24 and 25 to saponifier 12. A portion of the liquid effluent is diverted along line 26 to the recycle gas scrubber 15. Saponifier 12 is operated at a temperature above 10°, for example in the range from 50° – 115°C and the contents are maintained at this elevated temperature by withdrawing a liquid stream in line 27 and diverting a portion through a steam-heated recycle loop 28. The remainder of the stream withdrawn in line A typical mass balance for the apparatus described is given in the following Table, which relates to the production of propylene oxide from propylene using sodium hypohalite as oxidant.

| LINE COMPONENT TIME | 45 Ton/Hr | Wt% | 16 Ton/Hr | Wt% | 24 Ton/Hr | Wt% | 25 Ton/Hr | Wt% | 32 Ton/Hr | Wt% | 34 Ton/Hr | Wt% |
|---|---|---|---|---|---|---|---|---|---|---|---|---|
| Propylene Oxide | — | — | — | — | — | — | — | — | 1.53 | 1837.10 | — | — |
| Propylene Chlorhydrin | — | — | — | — | 2.59 | 4.65 | 2.59 | 2.46 | — | — | — | — |
| Sodium Chloride | 9.06 | 17.00 | 7.46 | 14.00 | 7.46 | 13.40 | 7.46 | 7.07 | — | — | 9.06 | 8.81 |
| Sodium Hypochlorite | — | — | 2.04 | 3.83 | — | — | — | — | — | — | — | — |
| Sodium Bicarbonate | — | — | — | — | 2.30 | 4.13 | 2.30 | 2.18 | 1.21(CO$_2$) | 29.40 | — | — |
| Water | 44.27 | 83.00 | 43.78 | 82.17 | 43.29 | 77.82 | 93.29 | 88.29 | 1.38 | 33.50 | 93.78 | 91.19 |
| TOTAL | 53.33 | 100.00 | 53.28 | 100.00 | 55.64 | 100.00 | 105.64 | 100.00 | 4.12 | 100.00 | 102.84 | 100.00 |

27 is pumped through line 29 which includes a cooler 30 and a portion of the cooled stream is recycled via line 31 to the top of saponifier 12 to act as a reflux. The remainder of the cooled stream is returned via lines 34 and 35 to the freezing unit 14.

As described above, the metal bicarbonate and vic-halohydrin react in the saponifier 12 to form oxirane compound, carbon dioxide, metal halide and water. The carbon dioxide evolved assists in stripping the oxirane compound, and the carbon dioxide and oxirane compound pass together as a gaseous stream via line 32 to distillation column 13.

In order to enhance the stripping of the oxirane compound from the contents of saponifier 12, olefinically unsaturated compound may be injected at the bottom of the saponifier via lines 19 and 33.

Distillation column 13 is operated at near total reflux using a refrigerated condensor in a reflux loop comprising lines 37 and 38. The overhead product gases are passed via lines 39 and 23 to recycle gas scrubber 15. The distillation column reboil heat is supplied by low pressure steam in a closed or open system represented by line 40. Oxirane compound is removed as a side-stream 41 at a point well below the top of the column and the column bottoms, comprising mainly water, are passed via lines 42 and 29 to join the cooled stream in lines 34 and 35. Excess water may be bled from the system via line 43 and make-up water (which may contain metal halide as required) may be introduced into the system via line 44.

The combined stream in line 35 comprises aqueous metal halide which is concentrated as required in freezer 14, the concentrated metal halide solution passing via line 45 to electrolytic cell 10 and a portion of the water separated in the freezer is pumped via lines 46 and 26 to join the liquid effluent flowing into saponifier 12 via line 25. The remainder of the water passed along line 52 to the top of the recycle gas scrubber, is used to scrub the gaseous effluent passing to the scrubber via line 23. If desired the quantity of water passing along line 26 may be reduced or eliminated by closing valve 51.

The bottoms from the recycle gas scrubber contain oxirane compound which is passed to distillation column 13 via line 47. The scrubber gases comprising carbon dioxide and olefinically unsaturated compound are passed to absorption column 11 via line 17 and 18 as described above, olefinically unsaturated compound and make-up carbon dioxide being introduced into the system via lines 48 and 49 and waste gases being vented via line 50.

This mass balance assumes a quantity of water of 50 tons/hour flowing in line 26 and entering saponifier 12 through line 25, however this could be reduced or omitted altogether. In such circumstances, it would also be possible to omit the freezer unit 14, in which case the stream withdrawn in line 27 from the bottom of the saponifier could be recycled directly back to the electrolysis cell.

The production of ethylene oxide and propylene oxide in accordance with the invention will now be described by way of example.

EXAMPLE 1

A. Chlorhydrin production

An equimolar mixture of carbon dioxide and propylene was passed into an aqueous solution containing 14 percent by weight of sodium chloride and 4 percent by weight of sodium hypochlorite, which was maintained at a constant temperature, which was varied in the range of $-15°C$. to $+10°C$. during a series of experiments. The reaction was followed by withdrawing from time to time a few drops of the reaction mixture and testing with an acidified solution of potassium iodide. The reaction was continued until no iodine was liberated, and the total time noted.

The volume of the reaction product was measured and an aliquot part was neutralized with hydrochloric acid, and extracted with ether. The extract was evaporated free of ether, dried and weighed. The chlorhydrins so obtained were then subjected to analysis by chromatography and infra-red spectroscopy.

The yields of the mixed chlorhydrins (1 chloro-2-propanol and 2-chloro-1-propanol), based on the sodium hypochlorite used were as follows:

| Temperature | Reaction Time | Yield |
|---|---|---|
| $-10°C.$ | 40 minutes | 82% |
| $0°C.$ | 33 minutes | 96% |
| $5°C.$ | 22 minutes | 94% |

B. Conversion to oxirane

A portion of reaction product from Step A was charged into a reaction vessel fitted with a condenser which was connected to two cold traps in series at $-40°C$. and $-80°C$. Stirring was effected mechanically and also by the bubbling of carbon dioxide into the solution. The vessel and its contents were heated very quickly to the reaction temperature, which, in a series of experiments, ranged from 50°C. to 115°C.

Samples were withdrawn from time to time and analyzed by titration for unreacted sodium bicarbonate in the solution and for propylene oxide collected in the cold traps by chromatography.

The yields of propylene oxide, based on the propylene chlorhydrin in the charge, varied from 70 percent to 94 percent in the temperature range of 50°C. to 115°C. with approximate reaction times in the order of 50 minutes to 15 minutes.

EXAMPLE 2

Example 1 was repeated using ethylene instead of propylene, the same procedures being followed. The yield of ethylene chlorhydrin, based on the sodium hypochlorite used, was 95 percent at 0°C. and a reaction time of 30 minutes.

The yield of ethylene oxide, based on the ethylene chlorhydrin charged to the vessel varied from 80 percent to 95 percent in the temperature range of 50°C. to 115°C, with approximate reaction times in the order of 60 minutes to 20 minutes.

A particular advantage of the process described herein is that a single apparatus (for example the apparatus described and illustrated herein) may be used without substantial modification for the production of both ethylene oxide from ethylene and propylene oxide from propylene.

Furthermore the process does not involve the handling of free halogen or alkali and accordingly the problems of corrosion encountered with these materials do not arise. The process can be operated with efficient utilization of reagents and the oxygen required in forming the oxirane compounds or vic-glycols is in effect derived from water and thus may be obtained cheaply. Also high purity hydrogen is produced as a byproduct of the process which may be sold, thus improving the overall economics of the process. It should be noted that the process described results in the production of substantially no noxious effluent likely to pollute the environment and that the impurity content of the metal halide solution produced as a result of the reaction between aqueous metal bicarbonate and chlorhydrin is generally not high enough to foul the electrolytic cell used to produce metal hypohalite.

I claim:

1. A process for the production of an oxirane compound comprising the steps of:
   1. reacting at a temperature not greater than 10°C. but above the freezing temperature of the system an olefinically unsaturated compound, carbon dioxide, water and a hypohalite in quantities sufficient to produce an aqueous product mixture comprising substantially equimolar quantities of bicarbonate and vic-halohydrin; and
   2. heating at least a portion of said aqueous product mixture to a temperature resulting in reaction together of said vic-halohydrin and said aqueous bicarbonate to form an oxirane compound.

2. A process according to claim 1 in which at least part of the carbon dioxide used in said reacting step comprises carbon dioxide evolved from the reaction mixture during said heating step.

3. A process according to claim 1 in which the hypohalite is a metal hypohalite.

4. A process according to claim 1 in which the bicarbonate is metal bicarbonate and the hypohalite is metal hypohalite formed by electrolysis of aqueous metal halide formed during said heating step.

5. A process according to claim 1 in which said heating step is carried out at a temperature of from 50°C to 115°C.

6. A process according to claim 1 in which said heating step is carried out at a pressure of from 0.5 to 2.0 Kg/cm² absolute.

7. A process according to claim 1 in which oxirane compound formed as a result of reaction between vic-halohydrin and aqueous bicarbonate is stripped from the reaction mixture with the aid of carbon dioxide formed in situ as a result of the reaction and/or with steam and/or with olefinically unsaturated compound.

8. A process according to claim 1 in which the temperature is from −15°C to +10°C.

9. A process according to claim 1 in which the temperature is from +5°C to +10°C.

10. A process according to claim 1 in which the contacting of the olefinically unsaturated compound, carbon dioxide, water and hypohalite is carried out at a pressure of from 1.5 to 5.0 Kg/cm² absolute.

11. A process according to claim 1 in which a substantially equimolar gaseous mixture of the olefinically unsaturated compound and the carbon dioxide is contacted with an aqueous solution of hypohalite.

12. A process according to claim 11 in which the aqueous solution contains from 2 to 5 wt percent of metal hypohalite.

13. A process according to claim 1 in which the olefinically unsaturated compound and the carbon dioxide are contacted with an aqueous solution containing up to 6 wt percent of metal hypohalite.

14. A process according to claim 1 in which the hypohalite is sodium hypochlorite.

15. A process according to claim 1 in which the olefinically unsaturated compound is ethylene or propylene.

16. A process as claimed in claim 1 comprising the steps of:
   i. forming an aqueous solution containing a metal hypohalite by electrolysis of an aqueous solution of metal halide,
   ii. intimately contacting an olefinically unsaturated compound and carbon dioxide with the aqueous solution containing metal hypohalite formed in step (i) so as to form an aqueous solution containing substantially equimolar quantities of metal bicarbonate and vic-halohydrin;
   iii. heating at least a portion of said aqueous solution formed in step (ii) to a temperature resulting in reaction together of vic-halohydrin and aqueous metal bicarbonate contained in said aqueous solution to form a product mixture comprising an oxirane compound together with metal halide, carbon dioxide and water;
   iv. separately recovering carbon dioxide, an aqueous solution of metal halide and a product stream comprising oxirane compound from the product mixture formed in step (iii);
   v. recycling carbon dioxide from step (iv) for use in step (ii) and
   vi. recycling aqueous metal halide solution from step (iv) for electrolysis in accordance with step (i).

17. A process according to claim 16 in which the concentration of the aqueous metal halide subjected to electrolysis is adjusted to within the range from 15 to 27 wt percent.

18. A process as claimed in claim 1 comprising the steps of:
  i. electrolyzing an aqueous solution of a metal halide to form an aqueous solution containing metal hypohalite and metal halide;
  ii. contacting the aqueous solution formed in step (i) with carbon dioxide and an olefinically unsaturated compound at a superatmospheric pressure to form an aqueous product mixture comprising substantially equimolar quantities of metal bicarbonate and vic-halohydrin;
  iii. raising the temperature of said aqueous product mixture formed in step (ii) to effect reaction between the vic-halohydrin and aqueous metal bicarbonate contained therein to form a product mixture comprising oxirane compound, carbon dioxide and aqueous metal halide;
  iv. separately recovering oxirane compound, carbon dioxide and aqueous metal halide from the product mixture formed in step (iii); and
  v. recycling aqueous metal halide recovered in step (iv) for electrolysis according to step (i); and
  vi. recycling carbon dioxide recovered in step (iv) for use as or as part of the carbon dioxide requirement of step (ii).

* * * * *